(12) United States Patent
Wei

(10) Patent No.: US 7,503,825 B2
(45) Date of Patent: Mar. 17, 2009

(54) ALUMINUM NITRIDE ARC DISCHARGE VESSEL HAVING HIGH TOTAL TRANSMITTANCE AND METHOD OF MAKING SAME

(75) Inventor: George C. Wei, Weston, MA (US)

(73) Assignee: OSRAM Sylvania Inc., Danvers, MA (US)

( * ) Notice: Subject to any disclaimer, the term of this patent is extended or adjusted under 35 U.S.C. 154(b) by 639 days.

(21) Appl. No.: 10/851,299

(22) Filed: May 21, 2004

(65) Prior Publication Data

US 2005/0258759 A1 Nov. 24, 2005

(51) Int. Cl.
*H01J 9/00* (2006.01)
*H05B 33/10* (2006.01)
(52) U.S. Cl. .......................................... 445/26; 445/23
(58) Field of Classification Search ......... 313/636–637; 445/23, 26, 27
See application file for complete search history.

(56) References Cited

U.S. PATENT DOCUMENTS

| | | | |
|---|---|---|---|
| 4,618,592 A | 10/1986 | Kuramoto et al. ............. 501/96 |
| 4,642,298 A | 2/1987 | Kuramoto et al. ............. 501/96 |
| 4,950,435 A | 8/1990 | Taniguchi et al. ............. 264/65 |
| 5,063,183 A | 11/1991 | Taniguchi et al. ............. 501/96 |
| 5,075,587 A | 12/1991 | Pabst et al. .................... 313/25 |
| 5,097,176 A * | 3/1992 | De Hair et al. ............... 313/570 |
| 5,182,239 A | 1/1993 | Hirokawa et al. ............. 501/98 |
| 5,242,872 A | 9/1993 | Taniguchi et al. ............. 501/98 |
| 5,936,351 A | 8/1999 | Lang ........................... 313/634 |
| 6,592,695 B1 * | 7/2003 | Polis et al. ................. 156/89.11 |
| 6,796,869 B1 * | 9/2004 | Coxon et al. ................... 445/26 |
| 2002/0067132 A1 * | 6/2002 | Takeda et al. .................. 315/99 |
| 2003/0062838 A1 * | 4/2003 | Niimi .......................... 313/634 |
| 2004/0135295 A1 * | 7/2004 | Niimi .......................... 264/656 |
| 2005/0070421 A1 | 3/2005 | Kanechika et al. |

FOREIGN PATENT DOCUMENTS

EP 0 587 238 A1 3/1994
WO WO 03/060952 7/2003

OTHER PUBLICATIONS

Kuramoto et al., Transparent AlN Ceramics, J. Mat. Sci. Lett., 3 (1984) 471-474.
Kuramoto et al., Development of Translucent Aluminum Nitride Ceramics, Ceramic Bulletin, 68 (4) (1989) 883-887.
Komeya et al., Effect of Various Additives on Sintering of Aluminum Nitride, Yogyo-Kyokai-Shi, 89 (6) (1981) 330-336.
Mitra et al., Effect of Heat Treatment on the Microstructure and Properties of Dense AlN Sintered with Y2O3 Additions, J. Am. Ceram. Soc., 78 (9) (1995) 2335-2344.

* cited by examiner

Primary Examiner—Toan Ton
Assistant Examiner—Bumsuk Won
(74) Attorney, Agent, or Firm—Robert F. Clark

(57) ABSTRACT

Aluminum nitride arc discharge vessels having a high total transmittance may be made by annealing the as-sintered AlN vessel in a nitrogen atmosphere, preferably at a temperature of at least about 1850° C. and for a time of at least about 50 hours. The annealing increases the total transmittance of the vessel to greater than 92% in the wavelength region from about 400 nm to about 700 nm. The annealed AlN discharge vessels are useful for lamp applications, such as metal halide lamps, and offer an improved durability and life over polycrystalline alumina (PCA).

17 Claims, 2 Drawing Sheets

ALUMINUM NITRIDE ARC DISCHARGE VESSEL HAVING HIGH TOTAL TRANSMITTANCE AND METHOD OF MAKING SAME

TECHNICAL FIELD

The present invention relates to AlN ceramic bodies suitable for the manufacture of arc discharge vessels and to methods for making the ceramic bodies. The invention further relates to high-intensity discharge (HID) lamps having such a discharge vessel, e.g., metal-halide lamps and high-pressure sodium lamps (HPS).

BACKGROUND OF THE INVENTION

Translucent polycrystalline alumina (PCA) ceramic has made possible present-day high-pressure sodium (HPS) and ceramic metal halide lamps. In HPS lamps, the typical wall temperature is 1250° C. in the center of the arc discharge tube, and 800° C. at the cold end. Typically, the operating life of an HPS lamp exceeds five years. In contrast, although the wall temperature of the arc discharge vessel in ceramic metal halide lamps (1000-1150° C.) tends to be somewhat lower than in HPS lamps, the operating life of the lamp is typically less than one year. This is because the PCA is corroded by the rare earth halide fills of metal-halide lamps. Hence, the durability and life of such lamps are significantly less than HPS PCA lamps.

Construction of the PCA vessel for a ceramic metal-halide lamp ranges from cylindrical to bulgy. Examples of these types of arc discharge vessels are given in European Patent Application No. 0587238A1 and U.S. Pat. No. 5,936,351, respectively. The bulgy shape yields a more uniform temperature distribution, resulting in reduced corrosion of the PCA by the lamp fills. Even so, the operating life of metal-halide lamps made with bulgy-shaped PCA discharge vessels has been reported to be two years, which is still significantly less than the 5-year life of PCA arc tubes in HPS lamps.

Aluminum nitride (AlN) has been shown to be more resistant to the corrosive effects of rare earth metal halide fills. The use of AlN arc discharge vessels for ceramic metal halide lamps is described in European Patent Application No. 0371315A1 and PCT Application No. WO 03/060952. However, it is difficult to make aluminum nitride ceramics into fully-dense, high-transmittance parts to meet the requirements for lamp applications. AlN has a wurtzite structure with hexagonal symmetry. Because of the anisotropy of AlN grains, and the grain-boundary phases (Ca—Al—O phases, nitrogen-containing calcium aluminate phases and Al—O phases such as $Al_2O_3$—N and $Al_2CO$) derived from the sintering aids (calcia, CaO) and surface oxide on AlN powders, the fully-dense sintered AlN ceramic is only translucent and not transparent. Both the total and in-line transmittance values of as-sintered AlN arc discharge vessels are generally lower (~75% and 0.2%, respectively) than those of PCA arc tubes (~98-99% and 8%, respectively). The in-line transmittance is not of concern for diffuse lighting applications such as outdoor or indoor, wide-area illumination. However, the low total transmittance is a major concern, since it strongly affects lumen output. Arc discharge vessels typically require >92% total transmittance in the visible wavelength region from about 400 nm to about 700 nm in order to be useable in commercial lighting applications.

SUMMARY OF THE INVENTION

It has been discovered that high total transmittance, aluminum nitride (AlN) arc discharge vessels can be made by annealing the as-sintered AlN vessels in nitrogen. In particular, the post-sintering, high-temperature anneal in nitrogen may effectively increase the total transmittance of sintered AlN discharge vessels to >92%, a level suitable for lamp use. More preferably, the total transmittance of the arc discharge vessel of this invention is at least about 95%, and even more preferably at least about 98%.

During the anneal, the grain size of the sintered AlN grows slightly, and the oxygen impurity, which is a major impurity in all AlN ceramics, is out-diffused and effectively removed as evidenced by the disappearance of the typical brown discoloration of the sintered AlN. The temperature, time, and partial pressure of oxygen of the annealing atmosphere are controlled so that the total transmittance improved. Preferably, the sintered AlN is annealed in flowing, high purity, nitrogen gas. The annealed AlN discharge vessels with high values of total transmittance (>92%) are useful for applications, such as metal halide lamps, and offer an improved durability and life over PCA.

DETAILED DESCRIPTION OF THE INVENTION

Figure 1:
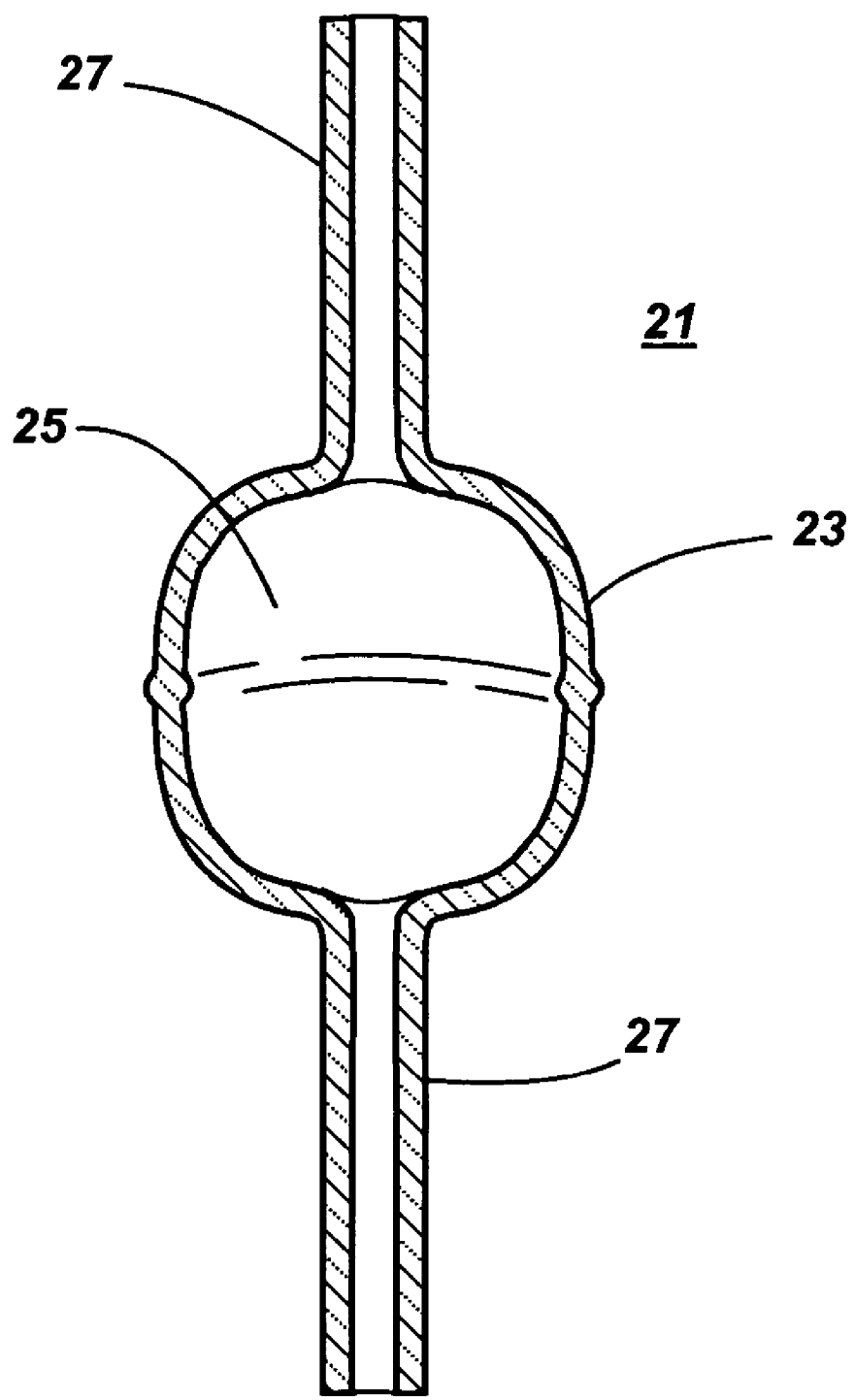
FIG. 1 is a cross-sectional illustration of an arc discharge vessel according to this invention.

AlN arc discharge vessels may be made by slip casting, injection molding, extrusion-blow molding, gel-casting, or pressing/machining of compacts of AlN powders or granules. FIG. 1 is a cross-sectional illustration of an arc discharge vessel according to this invention. The arc discharge vessel 21 has a ceramic body 23 which is comprised of sintered aluminum nitride. The ceramic body 23 has a total transmittance of >92% in the wavelength range from about 400 nm to about 700 nm. The body 23 defines an arc discharge cavity 25 and has two capillaries 27 extending outwardly in opposite directions from the discharge cavity 25. The capillaries are suitable for receiving, and sealing therein, electrode assemblies (not shown) which provide a conductive path for supplying electric power to the discharge vessel in order to strike and sustain an arc within the discharge cavity. Although the embodiment shown in FIG. 1 is a bulgy-shaped arc discharge vessel, other suitable shapes for the arc discharge vessel of this invention include tubular arc discharge vessels similar to HPS arc tubes.

Finely divided AlN powders, such as those (grade F and H) used in commercial AlN ceramics, are available from Tokuyama Corporation, Tokyo, Japan. Sintering is typically accomplished at 1700-1900° C. for 1-5 hours under nitrogen. Preferably, a sintering aid of from about 0.2 to about 5 weight percent calcia is added to the AlN powder prior to forming the green shape. For example, N. Kuramoto, H. Taniguchi, and I. Aso, "Development of translucent AlN ceramics," Cer. Bull. 68 [4] 883-887 (1989), describes the use of 2.1 wt % $3CaO.Al_2O_3$ (or 1.3 wt % CaO) as a sintering aid. The as-sintered AlN vessel is then annealed in a nitrogen atmosphere at a temperature and for a time sufficient to increase the total transmittance of the vessel to >92% in the visible wavelength range from about 400 nm to about 700 nm. Preferably, the as-sintered AlN vessel is annealed at a temperature of at least about 1850° C. More preferably, the annealing temperature is from about 1850° C. to about 1950° C. At temperatures above about 1950° C., the AlN will begin to vaporize causing damage to the discharge vessel. At temperatures below about 1850° C., it is difficult to obtain high total transmittance values even with long anneal times. For example, experiments have shown that annealing at 1800° C. for 60 hours is not sufficient to obtain a high total transmittance whereas annealing at 1850° C. for 60 hours is sufficient. Preferably, the as-sintered AlN vessel is annealed for at least about 50 hours, more preferably at least about 60 hours, and even more preferably at least about 100 hours.

To more fully illustrate the invention, a series of sintered AlN tube sections were made from an AlN powder containing a calcia sintering aid. Most of the AlN tube sections were 8.6 mm OD (8 mm ID) by 12 mm long and had 0.3 mm wall thickness. Some of the tube sections had a 0.5 mm or 0.8 mm-thick wall. The as-sintered AlN tubes were observed to have a generally light brown coloration. In-line transmittance measurements were made by passing a light beam through the tube samples (both walls) and measuring the specular, transmitted light. The in-line transmittance values (0.1-0.2%) of the as-sintered AlN tube sections, so measured, were significantly lower than that (4-10%) of regular PCA arc tubes, but this is thought to be not critical for general lighting applications. The in-line transmittance could further be improved through increasing the grain size, decreasing the second phases, and improving the surface smoothness. The major issue for the as-sintered AlN tubes was their low total transmittance which ranged from about 67% to 84%. As previously stated, the total transmittance needs to be >92% in order to be suitable for lamp applications.

Figure 2:
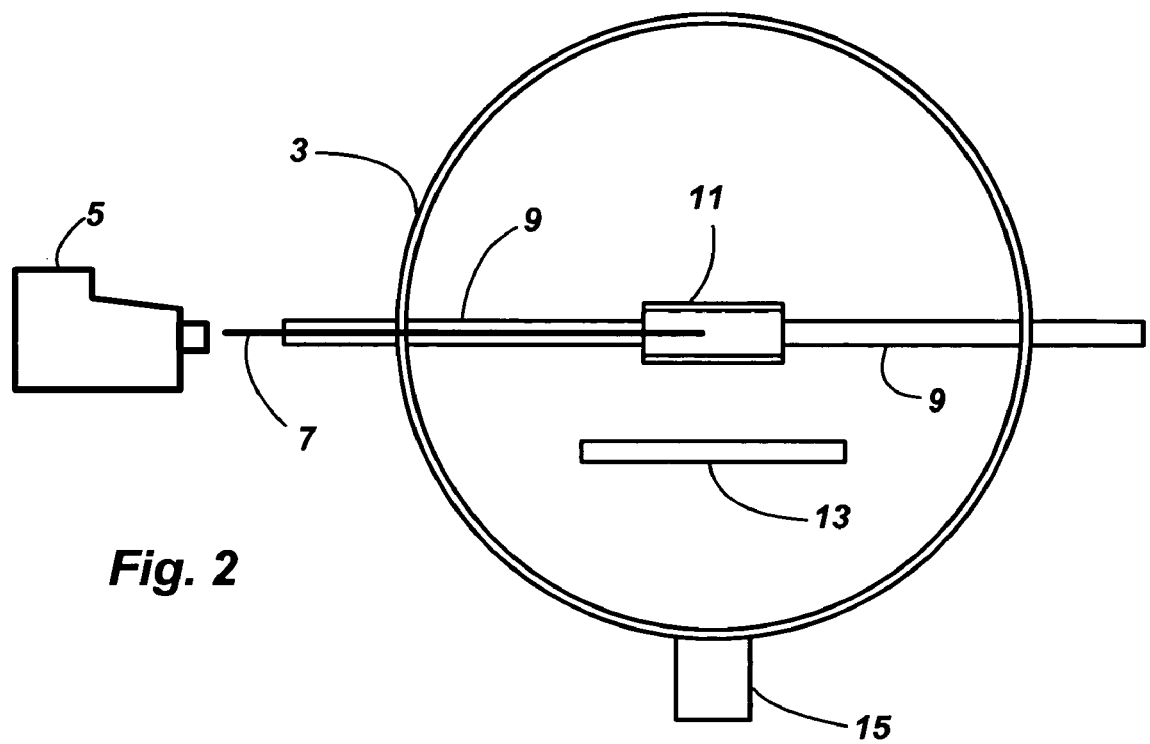
FIG. 2 is a schematic illustration of an apparatus used to measure the total transmittance of an arc discharge vessel.
Figure 3:
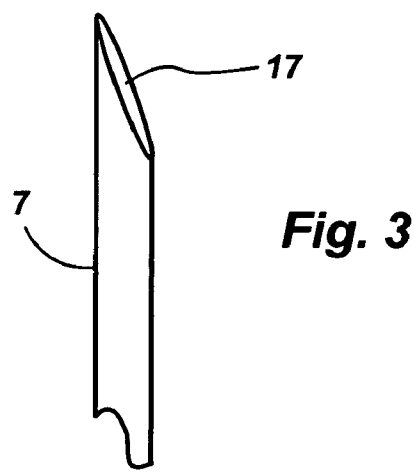
FIG. 3 is a magnified view of the tapered end of the optical fiber used in the apparatus shown in FIG. 2.

The total transmittance of the AlN tube sections was measured by placing the end of a small-diameter (0.5 mm) plastic optical fiber inside the tube and measuring the total integrated flux of light passing out of the sample. A schematic illustration of an apparatus for measuring the total transmittance is shown in FIG. 2. The arc tube sample 11 is mounted in a center region of integrating sphere 3 by supports 9 which hold the sample at opposite ends. A baffle 13 is positioned between the sample 11 and light detector 15. Optical fiber 7 is inserted through one of the supports 9 and into a center portion of the sample 11. Light is conducted from tungsten-halogen lamp 5 through the optical fiber 7. As shown in FIG. 3, the light-emitting end 17 of the optical fiber 7, which is placed inside the sample, has a 20° taper with respect to the cylindrical axis of the fiber in order to scatter the emitted light to produce a nearly point source. The light emitted from the end of the optical fiber passes through the sample wall, is collected by the integrating sphere, and the total integrated flux is measured by the light detector, preferably an unfiltered silicon detector. The percentage of the total integrated flux transmitted through the sample (compared to the total integrated flux emitted by the optical fiber alone) represents the total transmittance of the sample. Since the transmittance of the plastic optical fiber falls off at either end of the visible spectrum, i.e., less than about 400 nm and greater than about 700 nm, the total transmittance is effectively measured in the wavelength range from about 400 nm to about 700 nm. Suitable components for the apparatus are available from Labsphere, Inc. of North Sutton, N.H.

The oxygen solubility limit in AlN is reported to be quite high (~4.2 at. % on nitrogen sublattice): e.g. $2 \times 10^{21}$ oxygen atoms/cm$^3$ while the density of nitrogen atoms in AlN was $4.8 \times 10^{22}$ atoms/cm$^3$. Oxygen dissolved in AlN is linked to absorption at ~430 nm, as well as at 274 nm and 258 nm. It is believed that an oxygen impurity played an important role in the optical absorption of the as-sintered AlN tubes. Nitrogen vacancies due to non-stoichiometry of AlN are also known to give a broad absorption from 233 nm to 345 nm.

Carbon is believed to be the next most important impurity in AlN. Like oxygen, the solubility limit of C in AlN is also high. Carbon along with oxygen in AlN could form a second phase, Al$_2$CO, which is thought to be present in the as-sintered AlN tubes. Carbon most likely substitutes for Al in AlN resulting in Al vacancies. Since C is smaller than O or N(O$^{-2}$ or N$^{-3}$), diffusion of carbon in AlN should be faster than oxygen or nitrogen. When the oxygen and carbon impurities out-diffuse, they leave behind vacancies that have to be filled with nitrogen or aluminum. This means that N and Al have to migrate in when O and Al move out. Among C, N, O, and Al, nitrogen probably diffuses at the slowest rate, and therefore, should be the rate-limiting species for impurity out-diffusion or adjustment of the Al:N ratio (stoichiometry). The relatively high UV cutoff of the as-sintered AlN tubes is also thought to be partly due to carbon impurities.

According to the method of this invention, the total transmittance of the as-sintered AlN tubes may be increased to >92% by performing a post-sintering anneal in a nitrogen atmosphere. In one embodiment, the post-sintering anneal involves heating the as-sintered AlN arc tube at about 1850° C. for about 72 hours under flowing nitrogen in a graphite-element furnace. During the post-sinter anneal, it is believed that impurity solutes (O and C), and impurity or second phases such as Al$_2$O$_3$ and Al$_2$CO, Ca—Al—O, and Ca—Al—O—N solid or liquid phases, are distilled or purified from AlN (for example, by formation of Al$_2$O gas). The temperature, time, and partial pressure of oxygen of the annealing atmosphere are controlled so that the light-absorbing point defects and impurities (such as oxygen and carbon) are removed. Preferably, the nitrogen atmosphere is flowing, high-purity nitrogen gas having less than about 1 ppm oxygen.

Several as-sintered AlN tube samples were subjected to various post-sinter annealing conditions to determine the effects of annealing temperature, time, and atmosphere on the total transmittance. As shown in Table 1, the total transmittance of AlN tube samples increased from 67-84% before the post-sinter anneal to about 91-99% after the post-sinter anneal. After annealing, these tube sections no longer had the light brown coloration of the as-sintered AlN. The level of the total transmittance achieved (91-99%) for these samples was close to that (95-97%) of PCA tube sections of the same length measured in the same apparatus. The grain size grew slightly after annealing for 72 h at 1850° C. under flowing N$_2$ in graphite boat of a graphite-element furnace. Upon further annealing (a total 60-132 h at 1850° C.), total transmittance of AlN tube samples 1 to 5 reached 95-99%, while samples 6 to 15 annealed at ~1885-1900 C for 60-180 h reached 91-95%. Since experiments have shown that annealing at 1850° C. for 60 hours is sufficient to raise the total transmittance to >92%, it is preferred that the annealing time should be at least about 50 hours.

It is thought that at temperatures >1850° C. the Ca—Al—O and Ca—Al—O—N second phases derived from the sintering aids evaporate from AlN with a preferential loss of oxygen in the sintered AlN. The changes in the second phases could cause oxygen and carbon impurities dissolved in the AlN grains to out-diffuse to the grain-boundary phases, which would then evaporate from the AlN tubes. Annealing at temperatures below 1850° C., a relatively small level of liquid phase formed, and the grains did not grow significantly. Due to the slower kinetics at temperatures lower than 1850° C., it is expected that much longer times would be required to complete the out-diffusion of carbon and oxygen impurities if at all. For example, other experiments have shown that annealing at 1800° C. for 60 hours is not sufficient to effectively raise the total transmittance whereas annealing at 1850° C. for 60 hours is effective.

TABLE 1

| AIN tube sample number | Thickness, mm | As-sintered Total Transmittance, % | Post-anneal Total Transmittance, % | Anneal Conditions |
|---|---|---|---|---|
| 1 | 0.3 | 80.1 | 94.7 (after $1^{st}$ anneal) | 1850° C./72 h |
|   |     |      | 98.8 (after $2^{nd}$ anneal) | +1850° C./30 h |
| 2 | 0.3 | 80.1 | 77.0 (after $1^{st}$ anneal) | 1850° C./30 h |
|   |     |      | 95.1 (after $2^{nd}$ anneal) | +1850° C./30 h |
| 3 | 0.3 | 72.5 | 90.7 (after $1^{st}$ anneal) | 1850° C./72 h |
|   |     |      | 93.6 (after $2^{nd}$ anneal) | +1850° C./30 h |
|   |     |      | 96.6 (after $3^{rd}$ anneal) | +1850° C./30 h |
| 4 | 0.3 | 78.8 | 93.7 (after $1^{st}$ anneal) | 1850° C./72 h |
|   |     |      | 95.6 (after $2^{nd}$ anneal) | +1850° C./30 h |
|   |     |      | 96.9 (after $3^{rd}$ anneal) | +1850° C./30 h |
| 5 | 0.3 | 80.7 | Not measured (after $1^{st}$ anneal) | 1750° C./12 h |
|   |     |      | 84.4 (after $2^{nd}$ anneal) | +1850° C./48 h |
|   |     |      | 96.7 (after $3^{rd}$ anneal) | +1885° C./60 h |
| 6 | 0.3 | 84.0 | 82.5 (after $1^{st}$ anneal) | 1850° C./60 h |
|   |     |      | 92.5 (after $2^{nd}$ anneal) | +1885° C./60 h |
| 7 | 0.5 | 73.0 | 84.6 (after $1^{st}$ anneal) | 1885° C./60 h |
|   |     |      | 91.4 (after $2^{nd}$ anneal) | +1900° C./60 h |
| 8 | 0.5 | 73.3 | 70.6 (after $1^{st}$ anneal) | 1850° C./60 h |
|   |     |      | 87.4 (after $2^{nd}$ anneal) | +1885° C./60 h |
|   |     |      | 91.4 (after $3^{rd}$ anneal) | +1900° C./60 h |
| 9 | 0.8 | 68.2 | 82.1 (after $1^{st}$ anneal) | 1900° C./60 h |
|   |     |      | 92.5 (after $2^{nd}$ anneal) | +1900° C./120 h |
| 10 | 0.8 | 67.0 | 75.2 (after $1^{st}$ anneal) | 1850° C./60 h |
|    |     |      | 81.4 (after $2^{nd}$ anneal) | +1885° C./60 h |
|    |     |      | 86.3 (after $3^{rd}$ anneal) | +1900° C./60 h |
|    |     |      | 92.7 (after $4^{th}$ anneal) | +1900° C./30 h |
| 11 | 0.4 | 77.4 | 92.7 | 1890° C./60 h |
| 12 | 0.3 | 75.4 | 93.8 | 1890° C./60 h |
| 13 | 0.3 | 67.8 | 90.5 | 1890° C./60 h |
| 14 | 0.3 | 75.6 | 92.9 | 1890° C./60 h |
| 15 | 0.3 | 69.0 | 95.4 | 1890° C./60 h |
| PCA control-1 | 0.8 | 94.5 | | |
| PCA control-2 | 0.8 | 96.5 | | |

The data in Table 1 clearly show the benefit of the post-sinter anneal in increasing the total transmittance to the minimum level required for lamp applications. A higher pressure of nitrogen during the anneal might reduce the time needed for anneal to result in an improved total transmittance. The examples in Table 1 are from calcia-doped AlN. It is expected that this method is also applicable to sintered AlN made with other rare-earth and alkaline-earth-oxide sintering aids although the time and temperature conditions of the post-sinter anneal would likely have to be modified to account for any differences in the kinetics of the out-diffusion processes.

While there has been shown and described what are at the present considered the preferred embodiments of the invention, it will be obvious to those skilled in the art that various changes and modifications may be made therein without departing from the scope of the invention as defined by the appended claims.

I claim:

1. A method of making an arc discharge vessel having a ceramic body, comprising: forming the ceramic body of a sintered aluminum nitride and annealing the ceramic body in a nitrogen atmosphere at a temperature of at least about 1850 degree C. for a time of at least 50 hours to increase the total transmittance of the ceramic body to greater than 92% in a wavelength range from about 400 nm to about 700 nm.

2. The method of claim 1 wherein the total transmittance is increased to at least about 95%.

3. The method of claim 1 wherein the total transmittance is increased to at least about 98%.

4. The method of claim 1 wherein the ceramic body of sintered aluminum nitride is formed with a calcia sintering aid.

5. The method of claim 4 wherein the amount of the calcia sintering aid in the aluminum nitride prior to forming the ceramic body is from about 0.2 percent to about 5 percent by weight.

6. The method of claim 1 wherein the ceramic body has a wall thickness of 0.3 mm to 0.8 mm.

7. A method of making an arc discharge vessel having a ceramic body, comprising: forming the ceramic body of a sintered aluminum nitride; and, annealing the ceramic body at a temperature of at least about 1850° C. for a time of at least about 50 hours in a nitrogen atmosphere.

8. The method of claim 7 wherein the ceramic body is annealed for at least about 60 hours.

9. The method of claim 7 wherein the ceramic body is annealed for at least about 100 hours.

10. The method of claim 7 where the ceramic body is annealed at a temperature of from about 1850° C. to about 1950° C.

11. The method of claim 10 wherein the ceramic body is annealed for at least about 60 hours.

12. The method of claim 10 wherein the ceramic body is annealed for at least about 100 hours.

13. The method of claim 7 wherein the ceramic body of sintered aluminum nitride is formed with a calcia sintering aid.

14. The method of claim 13 wherein the amount of the calcia sintering aid in the aluminum nitride prior to forming the ceramic body is from about 0.2 percent to about 5 percent by weight.

15. A method of making an arc discharge vessel having a ceramic body, comprising:

sintering an aluminum nitride powder containing a calcia sintering aid to form the ceramic body; and, annealing the ceramic body at a temperature of about 1850° C. for a time of at least about 60 hours in a nitrogen atmosphere.

16. The method of claim 15 wherein the ceramic body is annealed for at least about 100 hours.

17. The method of claim 15 wherein the amount of the calcia sintering aid in the aluminum nitride powder is from about 0.2 percent to about 5 percent by weight.

* * * * *